(12) United States Patent
Lin et al.

(10) Patent No.: US 8,421,374 B2
(45) Date of Patent: Apr. 16, 2013

(54) APPARATUS FOR DRIVING LOAD

(75) Inventors: Chiu-Yuan Lin, Taipei (TW);
Zhen-Chun Liu, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 207 days.

(21) Appl. No.: 12/897,800

(22) Filed: Oct. 5, 2010

(65) Prior Publication Data

US 2011/0175550 A1   Jul. 21, 2011

(30) Foreign Application Priority Data

Jan. 21, 2010   (TW) ................................ 99101674 A

(51) Int. Cl.
*H05B 37/02* (2006.01)
(52) U.S. Cl.
USPC ............ 315/297; 315/192; 315/193; 315/307
(58) Field of Classification Search ............... 315/185 R, 315/192, 193, 209 R, 291, 294, 297, 307, 315/312
See application file for complete search history.

(56) References Cited

U.S. PATENT DOCUMENTS

| 7,471,287 | B2 * | 12/2008 | Chen et al. | 345/212 |
| 7,777,704 | B2 * | 8/2010 | S et al. | 345/82 |
| 8,018,170 | B2 * | 9/2011 | Chen et al. | 315/192 |
| 8,084,960 | B2 * | 12/2011 | Kuo et al. | 315/297 |
| 2009/0261743 | A1* | 10/2009 | Chen et al. | 315/192 |
| 2010/0194299 | A1* | 8/2010 | Ye et al. | 315/192 |

FOREIGN PATENT DOCUMENTS

| CN | 101109970 | 1/2008 |
| CN | 101330203 | 12/2008 |
| WO | 2007055519 | 5/2007 |

OTHER PUBLICATIONS

"First Office Action of China counterpart application" issued on Jan. 17, 2013, p. 1-p. 7.

* cited by examiner

*Primary Examiner* — Tung X Le
(74) *Attorney, Agent, or Firm* — Winston Hsu; Scott Margo

(57) ABSTRACT

An apparatus for driving loads is disclosed. The apparatus mentioned above for driving a plurality of loads includes a protection module and a current generating module. The protection module has a plurality of detection terminals and generates a plurality of detection results according to a plurality of driving voltages on the detection terminals. The current generating module provides a plurality driving currents according to the detection results for flowing through each of the loads, separately.

8 Claims, 2 Drawing Sheets

APPARATUS FOR DRIVING LOAD

This application claims the priority benefit of Taiwan application serial no. 99101674, filed on Jan. 21, 2010. The entirety of the above-mentioned patent application is hereby incorporated by reference herein and made a part of this specification.

BACKGROUND

1. Field of the Invention

The invention relates to an apparatus for driving loads. More particularly, the invention relates to an apparatus for driving loads of light-emitting diode (LED) strings.

2. Description of Related Art

In a conventional multi-channel apparatus for driving loads, to effectively ensure a security of a whole system, an over-voltage and/or over-current protection mechanism is generally used. However, when such over-voltage/current protection mechanism detects that at least one of the loads of the multi-channel is abnormal, the driving voltages or driving currents provided by the whole apparatus is disabled, such as that that the normal loads also stop working.

Taking the load of a light-emitting diode (LED) string as an example, when the apparatus for driving loads drives a plurality of the LED strings, a single (or multiple) LED string is probably short-circuited and damaged due to a long time usage, or due to an improper manual operation (for example, replacing a LED string). In the conventional art, such abnormity may cause a fact that all of the LED strings are simultaneously turned off, which may lead to inconvenience in utilization.

SUMMARY OF THE INVENTION

The invention is directed to an apparatus for driving loads, which can select to cut-off the driving currents flowing throw the loads with abnormal load voltages.

The invention provides an apparatus for driving loads, which is adapted to drive a plurality of loads, and includes a protection module and a current generating module. The protection module has a plurality of detection terminals coupled to the loads, and generates a plurality of detection results according to a plurality of driving voltages on the detection terminals. The current generating module is coupled to the loads and the protection module, and provides a plurality driving currents according to the detection results for flowing through each of the loads separately.

In an embodiment of the invention, when each of the driving voltages are greater than a comparison voltage, the current generating module turns off the corresponding driving currents according to each of the detection results.

In an embodiment of the invention, current values of the driving currents are identical.

In an embodiment of the invention, the current generating module includes a reference voltage generator and a plurality of current sources. The reference voltage generator is used for generating a reference voltage. The current sources are coupled to the reference voltage generator and the protection module. The current source are coupled to the loads, respectively. The current sources generate and provide the driving currents according to the reference voltage and the comparison results.

In an embodiment of the invention, each of the current sources includes a transistor and an adjustable resistor. A first terminal of the transistor is coupled to the corresponding load, and a control terminal thereof receives the reference voltage. The adjustable resistor is coupled between a second terminal of the transistor and a base voltage.

In an embodiment of the invention, the reference voltage generator includes a programmable shunt regulator and a current-limiting resistor. The programmable shunt regulator is coupled to the base voltage. The current-limiting resistor is coupled between the programmable shunt regulator and a power voltage.

In an embodiment of the invention, the protection module includes a plurality of protection units. The protection units are respectively coupled to the loads, and each of the protection units includes a voltage-dividing circuit and a transistor. The voltage-dividing circuit is used for receiving and dividing the corresponding driving voltage to generate a voltage-divided driving voltage. A control terminal of the transistor receives the voltage-divided driving voltage, a first terminal thereof provides the comparison result, and a second terminal thereof is coupled to a base voltage.

In an embodiment of the invention, the comparison voltage is a threshold voltage of the transistor.

In an embodiment of the invention, the loads are a plurality of light-emitting diode (LED) strings.

In an embodiment of the invention, each of the LED strings includes one or a plurality of LEDs connected in series.

According to the above descriptions, in the invention, the protection module is used to detect the driving voltages on the detection terminals connected to the loads, so as to determine whether or not each of the loads is abnormal (for example, short-circuited due to burnout), and accordingly stop supplying the driving current to the load having the abnormity, so that the normal loads can still normally work.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
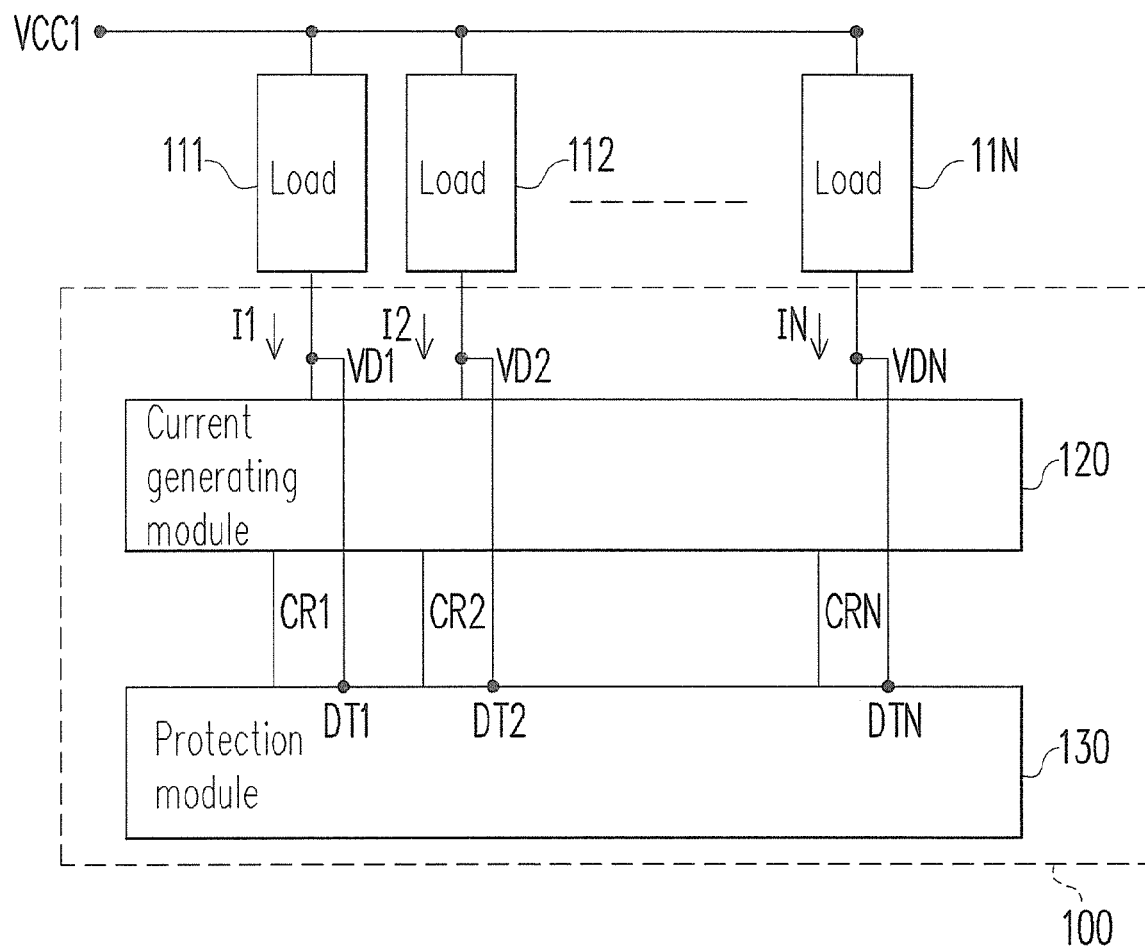
FIG. 1 is a schematic diagram illustrating an apparatus 100 for driving loads according to an embodiment of the invention.

Referring to FIG. 1, FIG. 1 is a schematic diagram illustrating an apparatus 100 for driving loads according to an embodiment of the invention. The apparatus 100 for driving loads is used for driving a plurality of loads 111-11N. The apparatus 100 for driving loads includes a current generating module 120 and a protection module 130. The current generating module 120 is coupled to the loads 111-11N, and is used for providing driving currents I1-IN to flow through the loads 111-11N separately. In the present embodiment, the loads 111-11N commonly coupled to a power voltage VCC1. The protection module 130 has a plurality of detection terminals DT1-DTN coupled to the loads 111-11N, and generates a plurality of detection results CR1-CRN according to a plurality of driving voltages VD1-VDN on the detection terminals DT1-DTN. The current generating module 120 is coupled to the loads 111-11N and the protection module 130, and is used for providing the driving currents I1-IN according to the detection results CR1-CRN to flow through the loads 111-11N separately.

The loads 111-11N can be N light-emitting diode (LED) strings (wherein N is a positive integer). Each of the LED strings includes one LED or a plurality of LEDs connected in series. When the driving currents I1-IN successfully flow through the loads 111-11N of the LED strings, the loads 111-11N of the LED strings are correspondingly turned on. It should be noticed that since a part or all of the LEDs included in the LED string (for example, the load 111) are probably damaged due to a long time usage, the driving voltage VD1 on the detection terminal DT1 of the protection module 130 is accordingly increased. Comparatively, when the protection module 130 detects that the driving voltage VD1 on the detection terminal DT1 is increased to be greater than a comparison voltage, the protection module 130 transmits the detection result CR1 to the current generating module 120, so that the current generating module 120 stops providing the driving current I1 flowing through the load 111 of the LED string.

Namely, when the driving voltage/driving voltages on any one of or a plurality of the loads 111-11N of the LED strings is/are increased due to burnout or an improper manual operation, the protection module 130 generates the corresponding detection result/detection results according to the driving voltage/driving voltages on the one or the plurality of the LED strings, and transmits the one or a plurality of the detection results to the current generating module 120, so as to cut off the driving current/driving currents flowing through one or a plurality of the LED strings having abnormalities. Moreover, in the present embodiment, the current generating module 120 continuously provides the driving currents to the normal one or a plurality of the LED strings, so that the normal one or a plurality of the LED strings can still normally work.

It should be noticed that the current generating module 120 can be an average current generating device. Namely, the driving current I1-IN generated by the current generating module 120 is identical. The current generating module 120 implemented by the average current generating device may lead to a fact that the brightness of the loads 111-11N of the LED strings are identical, so as to achieve brightness balance of the LED strings.

Figure 2:
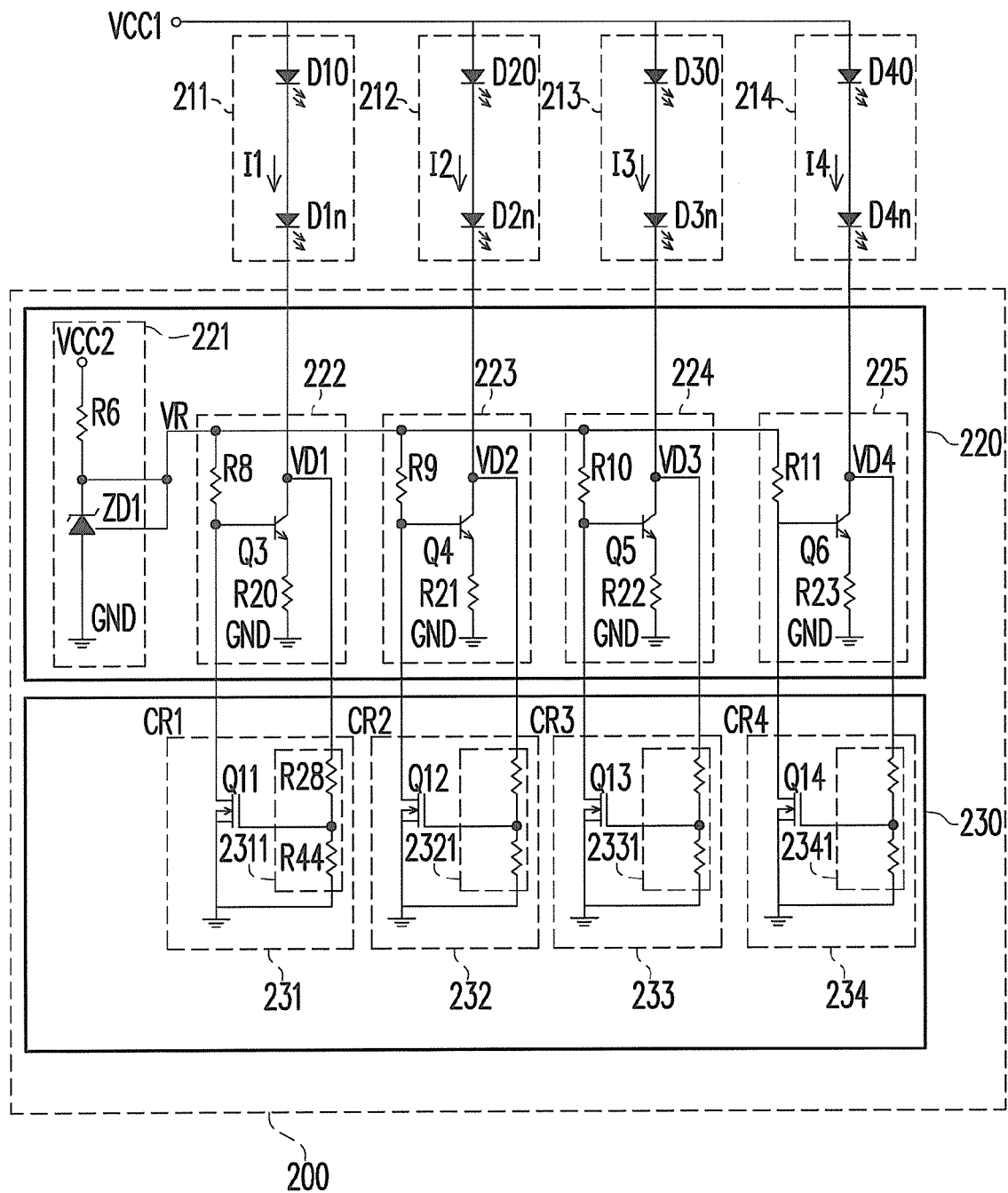
FIG. 2 is a schematic diagram illustrating an apparatus 200 for driving loads according to another embodiment of the invention.

Referring to FIG. 2, FIG. 2 is a schematic diagram illustrating an apparatus 200 for driving loads according to another embodiment of the invention. The apparatus 200 for driving loads is used for driving loads 211-214. The loads 211-214 are respectively formed by a plurality of LED strings, and the LED strings are respectively formed by connecting LEDs D10-D1n, D20-D2n, D30-D3n and D40-D4n in series. The LEDs D10-D1n~D40-D4n are all coupled between the power voltage VCC1 and the apparatus 200 in a way of forward bias.

The apparatus 200 for driving loads includes a current generating module 220 and a protection module 230. The current generating module 220 includes a reference voltage generator 221 and a plurality of current sources 222-225. The reference voltage generator 221 provides a reference voltage VR to the current sources 222-225, and the current sources 222-225 generate the corresponding driving current I1-I4 according to the reference voltage VR and the comparison results CR1-CR4.

In the present embodiment, the reference voltage generator 221 includes a programmable shunt regulator ZD1 and a current-limiting resistor R6. The programmable shunt regulator ZD1 is, for example, a regulator integrated circuit (IC) of TL431. The programmable shunt regulator ZD1 is coupled to a base voltage GND, and the current-limiting resistor R6 is coupled between a power voltage VCC2 and the programmable shunt regulator ZD1. When the power voltage VCC2 is greater than a breakdown voltage of the programmable shunt regulator ZD1, the reference voltage generator 221 generates the reference voltage VR having a voltage value equivalent to that of the breakdown voltage of the programmable shunt regulator ZD1. The current-limiting resistor R6 is used for limiting a current generated by a voltage difference of the power voltage VCC2 and the reference voltage VR.

Moreover, in the present embodiment, the current sources 222-225 include transistors Q3-Q6, resistors R8-R11 and adjustable resistors R20-R23. Taking the current source 222 as an example, in the current source 222, a first terminal of the transistor Q3 is coupled to the load 211, and a second terminal thereof is coupled to the adjustable resistor R20. A control terminal of the transistor Q3 directly receives the comparison result CR1 and receives the reference voltage VR through the resistor R8. The adjustable resistor R20 is coupled to the base voltage GND. Wherein, the control terminal of the transistor Q3 generates the corresponding driving current I1 according to the received reference voltage VR and comparison result CR1. Operation principles of the other current sources 223-225 are the same to that of the current source 222, so that detailed descriptions thereof are not repeated.

To ensure that the current sources 222-225 generate even (identical) driving currents I1-I4, the adjustable resistors R20~R23 can be adjusted. By adjusting resistances of the adjustable resistors R20-R23, errors of the driving currents I1-I4 generated due to device differences of the transistors Q3-Q6 can be compensated.

The protection module 230 includes a plurality of protection units 231-234. The protection units 231-234 include transistors Q11-Q14 and voltage-dividing circuits 2311-2341. Taking the protection unit 231 as an example, a first terminal of the transistor Q11 in the protection unit 231 provides the comparison result CR1 to the current source 222, and a second terminal of the transistors Q11 is coupled to the base voltage GND. Moreover, a control terminal of the transistor Q11 receives a voltage-divided driving voltage from the voltage-dividing circuit 2311. The voltage-dividing circuit 2311 includes resistors R28 and R44 connected in series. The resistor R28 receives the driving voltage VD1, and the resistor R44 is coupled to the base voltage GND, and the voltage-divided driving voltage is generated at a common node of the resistors R28 and R44.

Regarding a whole operation of the apparatus 200 for driving loads, and for example, the LED string 211 is abnormal, when at least one of the LEDs D10-D1n in the LED string 211 is short-circuited, the driving voltage VD1 is increased due to that a voltage drop contributed by the LED string 211 is decreased. Now, the voltage-divided driving voltage generated by the voltage-dividing circuit 2311 in the protection unit 231 is correspondingly increased. In other words, a voltage value (equal to the voltage-divided driving voltage generated by the voltage-dividing circuit 2311) on the control terminal of the transistor Q11 is accordingly increased. In the present embodiment, since the transistor Q11 is a metal-oxide-semiconductor field-effect transistor (MOSFET), an equivalent impedance of the transistor Q11 is accordingly decreased.

Once the voltage-divided driving voltage generated by the voltage-dividing circuit 2311 is greater than the comparison voltage (i.e. a threshold voltage of the transistor Q11), the transistor Q11 is turned on, and a voltage level of the comparison result CR1 received by the control end of the transistor Q3 in the current source 222 is pulled down, so that the voltage value of the driving voltage VD1 becomes higher. Comparatively, the voltage-divided voltage received by the control end of the transistor Q11 is accordingly increased, so that the voltage level of the comparison result CR1 received by the control end of the transistor Q3 in the current source 222 is further pulled down. The above operation is lasted until the transistor Q11 is totally turned on, and the voltage level of the comparison result CR1 is totally equal to the voltage level of the base voltage GND. Accordingly, the transistor Q3 in the current source 222 is turned off, so as to cut off the driving current I1 provided by the current source 222.

It should be noticed that once the current source 222 cuts off the provided driving current I1 according to the comparison result CR1 provided by the protection unit 231, in case that the power voltages VCC1 and VCC2 are not reset, the current source 222 cannot terminate the state that the current source 222 stops providing the driving current I1. Therefore, none driving current can be provided to the abnormal load before the user totally resolves the abnormity of the LED string 211, so as to ensure a security of the whole system.

It should be noticed that when the other LED strings 212-214 has abnormalities, operations of the protection module 230 and the current generating module 220 are that same as that described above, so that detailed descriptions thereof are not repeated.

In summary, in the invention, the protection module is used to detect the driving voltages of the loads driven by the apparatus for driving loads, and provide the comparison results according to the detected driving voltages. In this way, the current generating module can stop providing or continuously provide the driving currents to the loads according to the comparison results, so as to effectively cut off the driving currents provided to the abnormal loads. In this way, not only operations of the normal loads are maintained, but also a system security can be effectively ensured.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An apparatus for driving loads, adapted to drive a plurality of loads, comprising:
   a protection module, having a plurality of detection terminals coupled to the loads, for generating a plurality of detection results by respectively dividing a plurality of driving voltages on the detection terminals, wherein the protection module comprises:
   a plurality of protection units, coupled to the loads respectively, and each of the protection units comprising:
      a voltage-dividing circuit, for receiving and dividing the corresponding driving voltage to generate a voltage-divided driving voltage; and
      a transistor, having a control terminal receiving the voltage-divided driving voltage, a first terminal providing the comparison result, and a second terminal coupled to a base voltage; and
   a current generating module, coupled to the loads and the protection module, for providing a plurality of driving currents for separately flowing through each of the loads according to the detection results.

2. The apparatus for driving the loads as claimed in claim 1, wherein when the each of the driving voltages are greater than a comparison voltage, the current generating module cuts off each of the driving currents according to each of the detection results correspondingly.

3. The apparatus for driving the loads as claimed in claim 1, wherein current values of the driving currents are identical.

4. The apparatus for driving the loads as claimed in claim 1, wherein the current generating module comprises:
   a reference voltage generator, for generating a reference voltage; and
   a plurality of current sources, coupled to the reference voltage generator and the protection module, and coupled to each of the loads respectively, the current sources used for generating and providing the driving currents according to the reference voltage and the comparison results.

5. The apparatus for driving the loads as claimed in claim 4, wherein each of the current sources comprises:
   a transistor, having a first terminal coupled to the corresponding load, and a control terminal receiving the reference voltage; and
   an adjustable resistor, coupled between a second terminal of the transistor and a base voltage.

6. The apparatus for driving the loads as claimed in claim 1, wherein the comparison voltage is a threshold voltage of the transistor.

7. The apparatus for driving the loads as claimed in claim 1, wherein the loads are a plurality of light-emitting diode strings.

8. The apparatus for driving the loads as claimed in claim 7, wherein each of the light-emitting diode strings comprises one or a plurality of light-emitting diodes connected in series.

* * * * *